United States Patent [19]

Wainer

[11] Patent Number: 5,161,226

[45] Date of Patent: Nov. 3, 1992

[54] MICROPROCESSOR INVERSE PROCESSOR STATE USAGE

[75] Inventor: Susan E. Wainer, Lower Gwynedd, Pa.

[73] Assignee: JMI Software Consultants Inc., Springhouse, Pa.

[21] Appl. No.: 698,077

[22] Filed: May 10, 1991

[51] Int. Cl.⁵ .............................................. G06F 9/46
[52] U.S. Cl. .......................... 395/650; 364/DIG. 1; 364/281.7; 364/280.8; 364/247.8
[58] Field of Search .................. 364/DIG. 1, DIG. 2; 395/650, 725

[56] References Cited

U.S. PATENT DOCUMENTS

| | | | |
|---|---|---|---|
| 4,257,096 | 3/1981 | McCullough et al. | 364/DIG. 1 |
| 4,297,743 | 10/1981 | Appell et al. | 364/DIG. 1 |
| 4,435,766 | 3/1984 | Haber et al. | 364/DIG. 1 |
| 4,435,780 | 3/1984 | Herrington et al. | 364/DIG. 2 |

Primary Examiner—Thomas M. Heckler
Attorney, Agent, or Firm—John J. Simkanich

[57] ABSTRACT

A method for operating a multi-tasking, interrupt capable microprocessor under inverse processor state usage is provided whereby the effective time for both interrupt processing and switching context between task execution and interrupt processing is reduced, thereby significantly enhancing the overall performance of the operating system kernel. This increased performance is achieved by the elimination of the previously needed temporary storage in memory of volatile global registers and task context data. Volatile global registers are preserved in local registers during interrupt processing, thereby eliminating time-consuming transfers of data to and from temporary memory storage locations. A task procedure stack, rather than the interrupt stack, is utilized for interrupt records and frames containing user task context data. This is accomplished by programmably creating an inverse processor state designation. Therefore, the requirements to move this data between locations in memory as would otherwise be required is eliminated when performing context switches during interrupt processing.

6 Claims, 4 Drawing Sheets

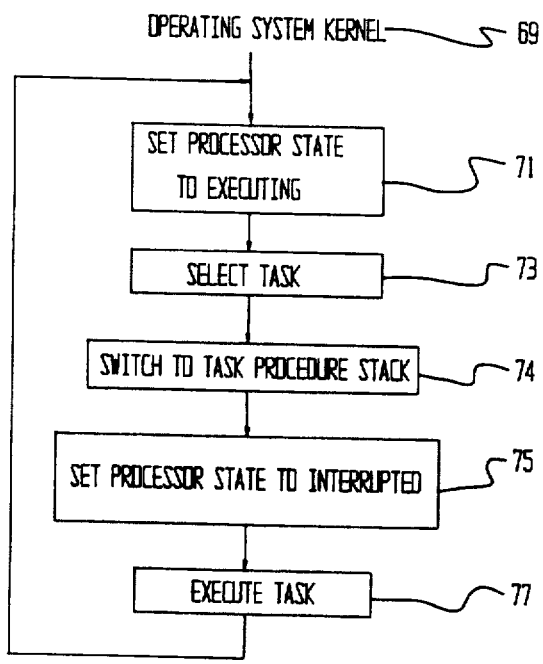

STATUS OF NORMAL PROCESSOR STATE FIELD

TASK PROCEDURE STACK
29,31

INTERRUPT STACK
27

STATUS OF INVERSE PROCESSOR STATE FIELD

TASK PROCEDURE STACK
29,31

INTERRUPT STACK
27

MICROPROCESSOR INVERSE PROCESSOR STATE USAGE

BACKGROUND OF THE INVENTION

The present invention relates to microprocessors for computers and other electronic devices, and especially relates to multi-tasking type microprocessors and methods of performing such multi-tasking.

Specifically, the invention addresses a method of significantly faster task switching and interrupt processing in a particular family of multi-tasking microprocessors.

A commercially available set of microprocessors, the Intel Corporation i960 family (also known as 80960), is an example of multi-tasking type microprocessors. The current i960 family includes the i960KA, i960KB, i960SA, i960SB and i960CA microprocessors, among others. These microprocessors are structured to have consistent software interfaces across multiple generations of microprocessor implementations of a common architecture.

These microprocessor chips contain an execution unit, an optional floating-point unit, and on-chip instruction cache. They also include a register-oriented instruction set, multiple register sets, a procedure call mechanism, and fundamental mechanisms for handling interrupts and faults.

Each microprocessor chip provides a single set of 16 "global registers" and multiple sets of 16 "local registers". The global registers are primarily used as general-purpose registers, and must be preserved across procedure boundaries. A "procedure" is a function callable from within a software program. The local registers provide storage for data variables that are local to an active procedure.

The i960's standard procedure call/return mechanism simplifies procedure calls, and provides a convenient means of preserving local procedure variables. A dedicated region of memory is assigned to a "procedure stack". This stack contains contiguous stack frames, one frame for each active procedure within a task. A frame provides storage area for local registers. Each time a procedure call is made, a new stack frame for the called procedure is allocated just beyond the current frame. This frame then becomes the current frame. A set of local registers is automatically allocated for the called procedure, and the local register set for the calling procedure is saved. When the called procedure executes a return, the current stack frame is deallocated, the previous stack frame is restored, and the local register set for the calling procedure is restored.

The i960 family of microprocessors uses three registers to maintain stack frame linkage information. These are a frame pointer which contains the address of the current stack frame, a stack pointer which contains the address of the next unused byte of the current stack frame, and a previous frame pointer which contains the address of the previous stack frame.

This microprocessor contains a control register, called the "process-controls register", which is used to store information about the current status of the processor. A single bit of this register, called the "state flag", reflects the state of the processor. When this bit is cleared (0), the processor is in "executing" state (i.e., it is currently executing a program). When this bit is set (1), the processor is in "interrupted" state (i.e., the processor has been interrupted so that it can service an interrupt request). This state flag is changed automatically by the processor as the processor switches between executing and interrupted state. The microprocessor also contains another control register, called the "arithmetic-controls register", which is used to store status and control information relating to arithmetic operations.

The Intel "80960KB Programmer's Reference Manual" (Order Number 270567-002), section "PROCESSOR AND PROGRAM STATES", page 7-6, recites: "In the executing state, the processor is executing the program. If the processor is interrupted while in the executing state, it saves the current state of the program, switches to the interrupted state, and services the interrupt. Upon returning from the interrupt handler, the processor resumes work on the program." This statement reflects the hardware design of the i960 processors, whereby the definition of the processor state is "executing" for task execution, and "interrupted" for interrupt servicing, and the state flag itself is modified by the processor as it switches between the two states.

The same manual, section "PROCESS CONTROLS", page 7-4, recites: "The state flag determines the state of the program. The encoding of this bit is shown in Table 7-1. This bit tells software whether the processor is currently executing a program (0) or has been interrupted so the (sic) it can service an interrupt (1)." This statement reiterates the fact that the state flag is totally under control of the processor, but may be read by software.

At no time has the manufacturer suggested that the processor state flag can or should be directly altered by the software, nor did the manufacturer ever intend that the processor state flag be used in any other mode than the "executing" state for task execution and the "interrupted" state for interrupt processing.

This microprocessor architecture includes a priority-based interrupt mechanism. Interrupt requests are generally sent to the microprocessor from an external source, often to request I/O (input/output) services. An "interrupt" breaks the control flow of a currently operating program so that the microprocessor can handle a more urgent job. The receipt of an interrupt signal causes an interruption of the program and switches the microprocessor into the interrupted state. Upon completion of servicing an interrupt, the microprocessor switches back into executing state, and resumes processing of the interrupted program.

Each interrupt request has associated with it an 8-bit interrupt vector number which points to a vector entry in the interrupt table. The vector entry contains the address of a specific software interrupt handler. An "interrupt handler" performs the specific action associated with a particular interrupt request.

In addition to the procedure stack, this microprocessor architecture has a single dedicated area of memory assigned to an "interrupt stack". This stack has the same structure as the procedure stack, in that it consists of contiguous stack frames. Interrupt records, which contain the state of interrupted programs, are also stored on the interrupt stack. Each interrupt stack frame has associated with it a single interrupt record.

Each interrupt has a programmably assigned priority; priorities range from 0 to 31, with 31 being the highest priority. If the interrupt priority is 31, or is higher than the processor's current priority, an interrupt handler is invoked. Otherwise, the interrupt is posted for later processing.

Whenever this microprocessor receives an interrupt signal, it compares the priority of the interrupt request with the processor's current priority to determine whether to service the interrupt immediately. If the interrupt priority is higher than that of the processor, the processor services the interrupt immediately. If the interrupt priority is equal to or less than that of the processor, the processor records the new interrupt in the pending interrupt field of an interrupt table, and the servicing of the interrupt is delayed.

When this microprocessor receives a higher priority interrupt while it is in executing state (i.e., executing a task), it performs the following actions to service the interrupt:

(1) It switches from the current procedure stack to the interrupt stack, and the start of the interrupt stack becomes the current stack pointer for the processor;

(2) It saves the current state of the process-controls register, the arithmetic-controls register, and the current interrupt vector number in an interrupt record on the current stack, which has become the interrupt stack;

(3) For certain microprocessors in the i960 family, if the execution of an instruction was suspended, a resumption record for the suspended instruction is included in the interrupt record, and a resume flag in the saved process controls field is set;

(4) It sets the state flag in the process-controls register to "interrupted", the execution mode to "supervisor", and the priority field to the priority of the interrupt;

(5) It clears a trace-fault-pending flag and a trace-enable flag in the process-controls register; and (6) It performs an implicit call to the interrupt handler. The address for the procedure that is called is that which is specified in an interrupt table for the specified interrupt vector. A new frame for the interrupt handler is allocated on the current stack, and the current frame pointer is loaded into a global register. A new set of local registers is allocated for the interrupt handler. Upon entry to the interrupt handler, the processor is in interrupted state and supervisor mode.

Once the microprocessor has completed the interrupt processing, it performs the following action on the return from the interrupt:

(1) It copies the arithmetic controls information from the interrupt record into the arithmetic-controls register;

(2) It copies the process controls information into the process-controls register whereby this action restores the processor stare to executing;

(3) If a resume flag of the process-controls register is set, it copies the resumption record from the interrupt record to the microprocessor Processor Control Block (PRCB);

(4) It deallocates the current interrupt stack frame and interrupt record from the interrupt stack, and releases the allocated set of local registers;

(5) It checks the interrupt table for pending interrupts that are higher than the priority of the interrupt which the processor is executing. If a higher priority pending interrupt is found, it is handled as if the interrupt occurred at this point; and (6) It then performs a return operation. This will cause the processor to switch back to the stack frame on the procedure stack that the processor was using prior to the interrupt, restore the local register set for that procedure, and resume the interrupted procedure. The processor has now returned to "executing" state.

If the processor receives an interrupt while it is in the interrupted state (i.e., the processor is servicing another interrupt), and the new interrupt has a higher priority than the interrupt currently being serviced, the processor performs the same action as that described above for the executing state except that the processor does not need to switch stacks, since the interrupt stack will already be in use. A new interrupt record and interrupt frame are created on the current stack, which is still the interrupt stack, immediately following the frame for the interrupted interrupt handler. On the return from the current interrupt handler to the previous interrupt handler, the processor deallocates the current stack frame and interrupt record, and remains on the interrupt stack.

The manufacturer, in its previously quoted reference manual at the section on "INTERRUPT HANDLING ACTIONS", at pages 8-4 through 8-6, has recited: "When the processor receives an interrupt, it handles it automatically. The processor takes care of saving the processor state, calling the interrupt-handler routine, and restoring the processor state once the interrupt has been serviced. Software support is not required. . . . When the processor receives an interrupt while it is in executing state (i.e., executing a program), it performs the following actions to service the interrupt; this procedure is the same regardless of whether the processor is in the user or the supervisor mode when the interrupt occurs: 1. The processor switches to the interrupt stack . . . 4. The processor allocates a new frame on the interrupt stack . . . 5. The processor switches to the interrupted state. . . . Once the processor has completed the interrupt procedure, it performs the following action on the return: . . . 4. The processor deallocates the current stack frame and interrupt record from the i-interrupt stack and switches to the local stack or the supervisor stack (whichever one it was using when it was interrupted). . . . 6. Assuming that there are no pending interrupts to be serviced, the processor switches to the executing state and resumes work on the program. . . . If the processor receives an interrupt while it is servicing another interrupt, . . . The interrupt record is saved on the top of the interrupt stack, prior to the new frame that is created for use in servicing the new interrupt. On the return from the current interrupt handler to the previous interrupt handler, the processor deallocates the current stack frame and interrupt record, and stays on the interrupt stack."

Another member of the common i960family is the i960CA microprocessor. The Intel "80960CA User's Manual" (Order Number 270710-001) at the section "THE 80960 INTERRUPT MODEL", pages 6-2 through 6-9, recites: "The architecture defines two data structures to support interrupt processing: the interrupt table and the interrupt stack. . . . The method that the processor uses to service an interrupt depends on the state the processor is in when it receives the interrupt. If the processor is executing a background task when an interrupt request is to be serviced, the interrupt context switch must change stacks to the interrupt stack. This is called an executing-state interrupt. If the processor is already executing an interrupt handler, no stack switch is required since the interrupt stack will already be in use. This is called an interrupted-state interrupt."

The manufacturer has constructed its i960 series architecture so that all interrupt records and interrupt frames are placed on the interrupt stack, programs are executed in processor "executing" state, interrupts are serviced in processor "interrupted" state, and that an executing-state interrupt causes a switch to the interrupt stack.

A major aspect of prior microprocessor multi-tasking architecture, including that of the i960 family, is the presence of mechanisms related to task management. The task-management mechanisms use synchronization logic to provide correct behavior in the event of multiple concurrent tasks. Task management is performed with two operations: (1) suspend task and save task context, and (2) restore task context and resume task. This mechanism allows an operating system kernel to switch tasks explicitly.

In a multi-tasking, real-time system, reevaluation of task priorities for scheduling is often done following an interrupt. It often becomes mandatory to preempt the currently active task in favor of a higher priority task which has been waiting for an event. This means that upon completion of interrupt processing, an operating system kernel must prevent the normal resumption of the interrupted task. After the higher priority task has completed its processing, the context of the task which had been interrupted, and then preempted, can be restored and that task may be resumed.

When a preemption is to occur at the completion of interrupt processing, the processor switches from interrupted to executing state when it begins the execution of the higher priority task. The context status of the task which had been interrupted exists in the interrupt record and frame of the interrupt handler at the beginning of the interrupt stack. If an interrupt should occur while the higher priority task is executing, the processor will then switch to interrupted state, and create a new interrupt frame and record at the beginning of the interrupt stack, thus overwriting the previous interrupt record and frame for the task that had been preempted. The solution presented by the i960 series manufacturer is to have the operating system kernel copy the context for the interrupted task from the interrupt stack to another temporary holding area of memory prior to preempting an interrupted task. This area of memory must be unique to the interrupted task, and may not be shared by any other task.

The i960 series manufacturer's recommended, expressly stated established procedure is to create an array of dedicated task control blocks, one per task. The task context information which must be copied from the interrupt record to the task control block includes the process-controls information, the arithmetic-controls information, and an instruction resumption record, if one exists. Also to be saved are the previous frame linkage pointer and the contents of the volatile global registers. This copy operation is required because when the interrupted task is resumed at a later time, the original interrupt frame on the interrupt stack, along with its allocated local register set, is no longer accessible.

Generally in a multi-tasking environment, when the higher priority task has completed its execution, and it is time to resume the previously interrupted (preempted) task, the contents of the volatile global registers must be restored, and the normal interrupt return procedure (described previously in this section) must be executed so that the processor context, as well as the task context, can be properly restored.

Maintaining task control blocks and copying data into and out of memory does introduce significant overhead to interrupt handling. This becomes more pronounced in multi-tasking environments under conditions of frequently occurring interrupts.

Interrupt handling, task switching and preemption are the most time-critical areas of code for a multi-tasking operating system, and each unnecessary instruction can degrade system performance. It is therefore highly desirable to develop a method of operation for such a microprocessor where task switching times are reduced as much as possible and the speed of interrupt processing is enhanced.

SUMMARY OF THE INVENTION

The object of the present invention is to provide a method of operating a multi-tasking microprocessor with interrupt capability to significantly reduce context switching time and interrupt processing time, thereby contributing to the effective speed of the microprocessor. Context switch time is the amount of time required to transfer control from one user task to another user task, and is an important measurement of the overall performance of a multi-tasking operating system kernel. Interrupt processing is another time-critical area of code for an operating system, since providing a faster response time to real-time events improves overall system performance.

The present invention provides such a method for increasing the performance of said multi-tasking interrupt capable microprocessor by eliminating the time-consuming transfer of data into and out of a task control block memory area during interrupt processing, and removing the need for creating and maintaining task control blocks.

The present invention is realized in a method of operating such a microprocessor with inverse processor state usage. This method is accomplished by operating the architecture of such a microprocessor under interrupt conditions whereby a "state" bit is inversely set during task execute state and interrupt state, thereby obversely operating portions of the preestablished interrupt procedure of the microprocessor. By using the pre-existing microprocessor state in a manner directly opposite to current standard procedure, the invention changes established methods of operation by eliminating the need to transfer current status of process controls data, arithmetic data, and a resumption record, as well as user stack pointer information into a temporary memory location (i.e., into a task control block) when the microprocessor switches to a higher priority task during interrupt processing. The size of a resumption record is processor dependent. The i960KB, for example, has a resumption record size of 16 bytes. The invention also allows volatile global registers to be preserved in local registers, rather than memory locations, during interrupt processing.

In the present invention, the process-controls register for the microprocessor is programmably defined by an operating system kernel to have a state bit value normally designated as "interrupted", (1), when the processor is currently executing a task. This is the inverse condition for this bit.

With this inverse value of the state bit, the operating system kernel operates upon receipt of an interrupt to change the state bit to the value normally designated as "executing", (0). This again is the inverse condition for this bit.

By using the processor state inversely, the present invention provides a method of having interrupt records and interrupt frames automatically stored on the current task procedure stack at the time of an interrupt. Because the state of the microprocessor is "interrupted" during task execution, an interrupt signal received during task execution does not cause a switch to the interrupt stack, since the processor assumes it is currently executing out of the interrupt stack. Therefore, an interrupt record and interrupt frame are created by the processor on the current stack, which is actually the task procedure stack. The processor then sets the system state to "interrupted". The operating system kernel changes the system state to "executing", which is the inverse condition for this bit.

If a higher priority interrupt occurs while the microprocessor is in the executing state (i.e., servicing an interrupt request which occurred during task execution), the microprocessor makes a normal switch to the interrupt stack, and sets the system state to "interrupted". Since this interrupt is a "nested interrupt", (i.e., the interrupt was received while the processor was processing another interrupt), the operating system kernel does not change the system state from "interrupted". Succeeding interrupts will also be processed on the interrupt stack, and the system state remains "interrupted". Therefore, all nested interrupts, and only nested interrupts, will be handled in the interrupt stack.

All volatile global registers must be saved when an interrupt is first received, and then later restored prior to resuming the interrupted task. These registers must be saved before an interrupt handler can make procedure calls. Under the present invention, global registers are simply transferred to local registers at the start of interrupt processing, and then restored from the local registers at the completion of interrupt processing. This method of preserving global registers utilizes high speed register moves, as opposed to time-consuming memory loads and stores, and is possible only under the present invention. Without the present invention, global registers must be moved to and from temporary memory storage. The execution time of a memory or store instruction is affected by the state of the bus (busy or non-busy), and whether or not zero-wait state memory is used. In addition, each instruction requires effective address calculation. These factors may cause memory loads and stores to be 4-5 times as slow as register to register moves.

If the interrupt processing mandates a preemption of the currently active task in favor of a higher priority task, there is no need to transfer task context data to a task control block, since the task context data is safely contained in the interrupt record and interrupt frame on the task procedure stack. The task procedure stack resides in memory dedicated to the current task and not shared by any other task. Therefore, this memory can not be overwritten during execution of the higher priority task. Global registers are safely preserved in the local register set assigned to the interrupt frame on the task procedure stack.

When the higher priority task has completed its execution, and the preempted task can now be resumed, the operating system kernel transfers control to the interrupt record and frame already existing on the preempted task's procedure stack, and the local registers for that frame are automatically restored. Volatile global registers can now be restored, and the interrupt return procedure to the preempted task can be executed normally. occur while processing a nested interrupt (i.e., an interrupt signal is received while a previous interrupt is being processed). At the completion of the processing of a nested interrupt, control is always returned to the previous interrupt's processing. Therefore, the invention eliminates the overhead of having to save task context from the interrupt stack, since the interrupt stack contains interrupt records and frames for nested interrupts only.

As a direct result of the operating system software altering the processor state flag, under the present invention tasks now operate in "interrupted" state, interrupts which interrupt tasks are now serviced in "executing" state, and interrupt records and interrupt frames for above such interrupts are created on the task procedure stack. This method of processor implementation is in direct contradiction to the architecture definition of the i960 interrupt model as defined by the manufacturer. As a result of the above described inverse method, the invention eliminates the standard practice of defining and maintaining task control block structures as well as eliminating transfers of data to and from the memory task control block structures, improving context switching time for the microprocessor, and significantly reducing overhead during critical interrupt processing.

DESCRIPTION OF THE DRAWINGS

The features, operation and advantages of the present invention will become readily apparent from a reading of the following Detailed Description of the Invention with the accompanying drawings in which like numerals refer to like elements and in which:

FIG. 3a is a chart illustration of the processor state field value defining task execution states, under the standard method of operation (prior art);

FIG. 3b is a chart illustration of the processor state field value defining task execution states, under the inverse method of operation of the present invention;

FIG. 3c is a chart illustration of the processor state value during nested interrupt processing;

DETAILED DESCRIPTION OF THE INVENTION

Figure 1:
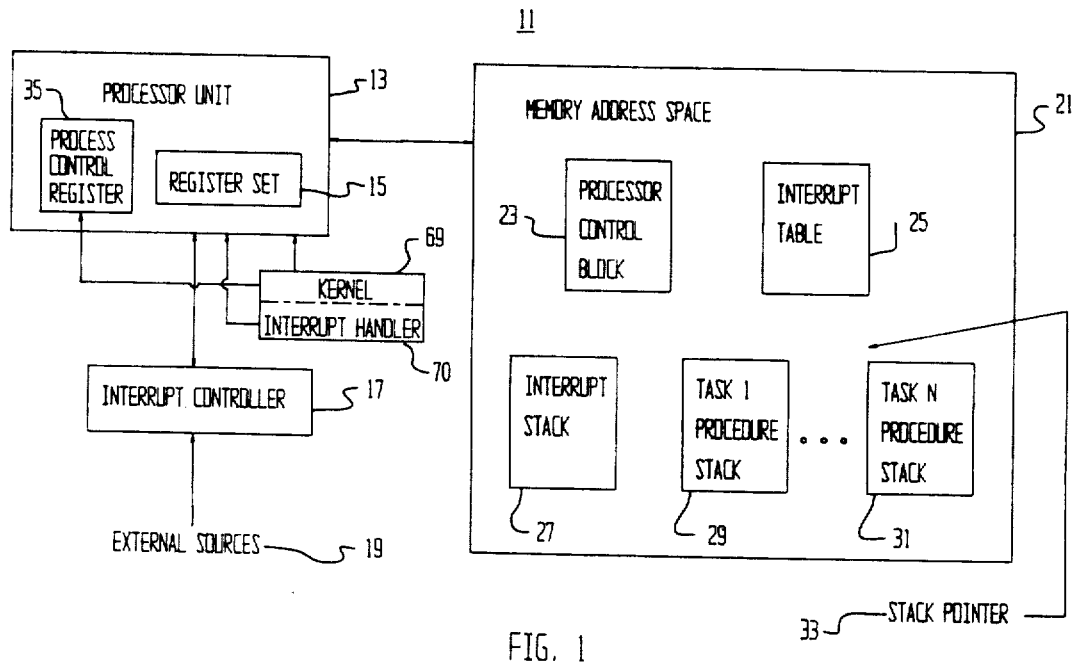
FIG. 1 is a block diagram of the microprocessor and its data handling structures.

A multi-tasking microprocessor with interrupt capability is operated under a method of inverse processor state usage. A microprocessor system environment 11, FIG. 1, includes the base architecture of a commercially available microprocessor, such as an Intel Corporation i960microprocessor. This architecture includes a processor unit 13, which contains a register set 15 and is connected to an interrupt controller 17. For some processors in the i960family, the interrupt controller 17 may actually be part of the processor 13 unit. The interrupt controller 17 receives interrupt request signals from external sources 19.

The processor unit 13 is connected to a memory address space 21. Included within memory space 21 is a Processor Control Block 23, an interrupt table 25, an interrupt stack 27 and multiple task procedure stacks 29, 31. A system stack pointer 33 defines the current stack frame location.

The microprocessor system 11 also includes a process-controls register 35 in the processor unit 13. This process-controls register 35 has several distinct fields. The process-controls register 35 is implemented as a 32-bit register with bit "0" being the least significant bit and bit "31" being the most significant bit. However, the size of this register can vary.

Figure 2:
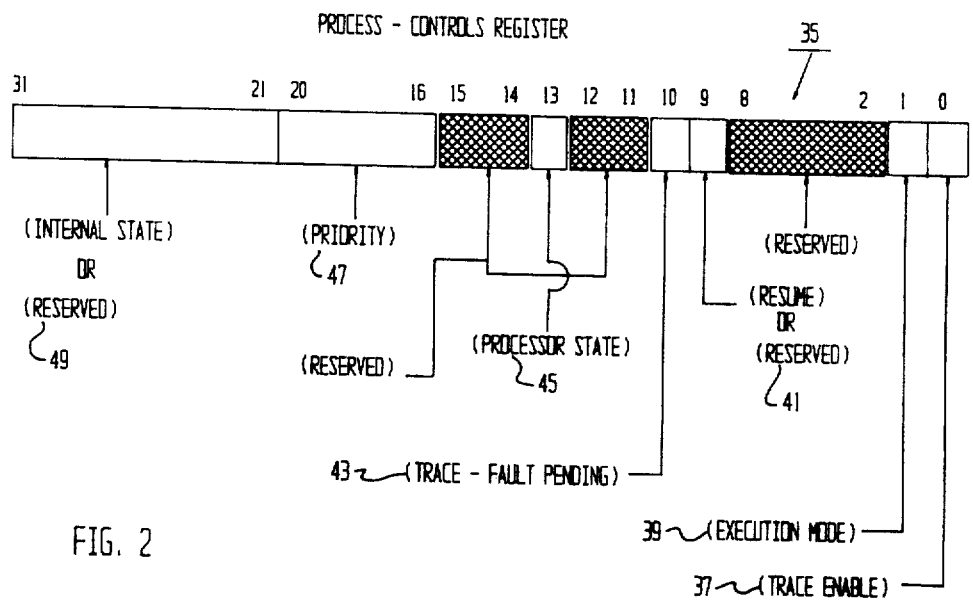
FIG. 2 is an illustration of the fields of a process-controls register operated on by the microprocessor structure of FIG. 1.

An operating system kernel 69 (software) which includes an interrupt handler 70 (software) is connected to operate with the processor unit 13 and on the process-controls register 35. Bit "0" of the process-controls register 35, FIG. 2 defines a trace enable field 37, while bit "1" defines an execution mode field 39. Bit "9" of the register 35 defines a resume field 41 which may be used or not. Bit "10" defines a trace-fault pending field 43. Bit "13" of the register 35 defines the processor state field 45, while bits "16–20" define a priority value field 47, and bit "21–31" define the internal state field 49 which may be used or not. Bits "2–8", "11", "12", "14" and "15" of the register 35 are not used.

The present invention takes the microprocessor hardware architecture provided as the Intel Corporation i960 family of microprocessors and operates this architecture essentially "inside-out" to established designed practice with respect to the processor 13 state. While the present invention is directed to the i960 family of microprocessors, where the process 13 state is defined in the process-controls register 35, processor state field 45, the method of the present invention can also be implemented in other families of microprocessors with similar architecture design.

The chart of 51 of FIG. 3a shows the value of the processor state field 45 with respect to the processor 13 state during task execution, under control as defined in the prior art for the i960 microprocessor architecture. The microprocessor sets processor state field 45 to a logical "0", line 53, when the task is executing. The microprocessor sets the processor state field 45 to a logical "1" when the task is interrupted, line 55.

A second chart 57, shown in FIG. 3b, illustrates the value of the processor state field 45 set according to the method of the invention. The operating system kernel 69 inversely sets the processor state field 45 to a logical "1", line 59, when the task is executing, and inversely sets the processor state field 45 to a logical "0", line 61, when the task is interrupted. By comparing the charts 51 and 57, one can see that the invention, when implemented by the operating system kernel 69, imposes an inverse or "inside-out" status to the previous implementation of the processor state field 45 of the process-controls register 35.

A third chart 63, FIG. 3c, illustrates the value of the processor state field 45 when the microprocessor 11 is servicing a "nested" interrupt, i.e., a higher priority interrupt received while another interrupt is being serviced. Here, the processor state field 45 is set to a logical "1" for the interrupted state, line 65. For nested interrupts, the operating system kernel 69 conforms to the previous implementation of the processor 13 state.

Figure 4B:
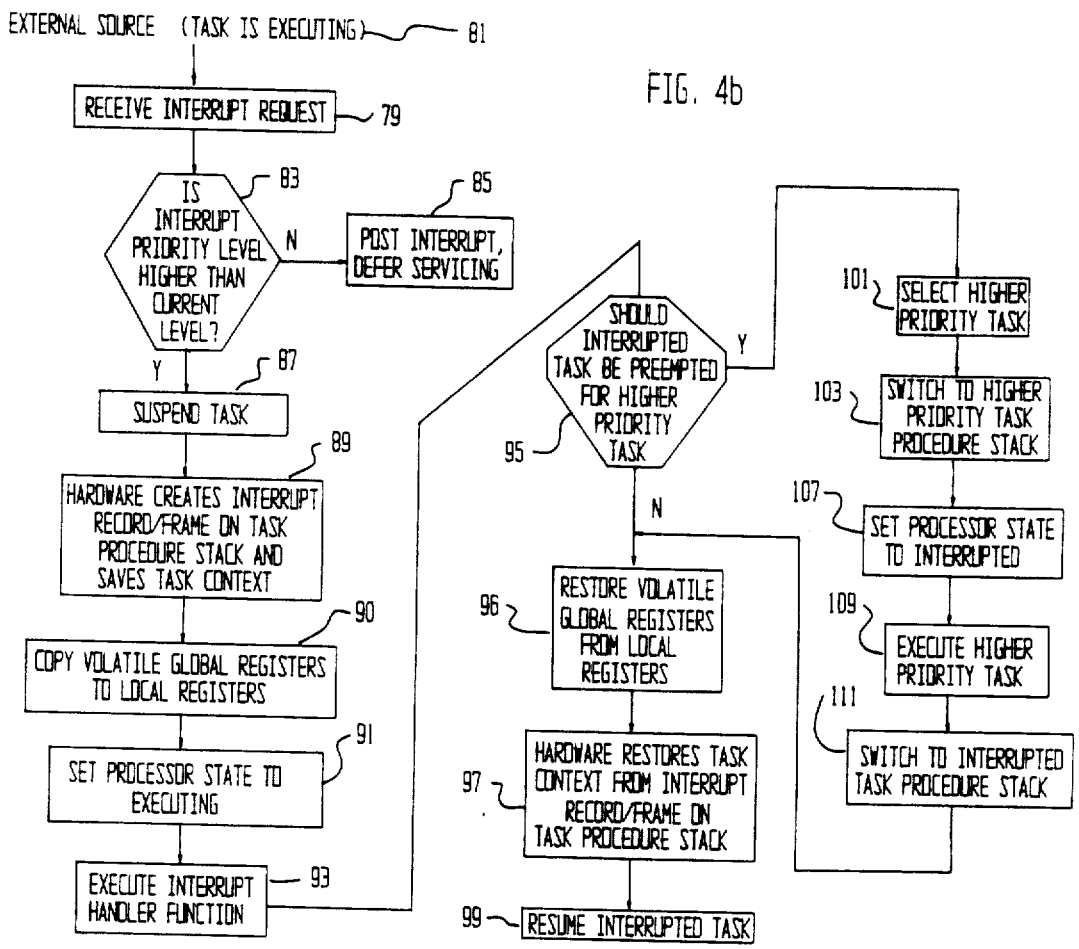
FIG. 4, consisting of 4a, 4b, and 4c, is a detailed logic flow chart of the process (method) of the present invention in controlling the microprocessor operation.
Figure 4C:
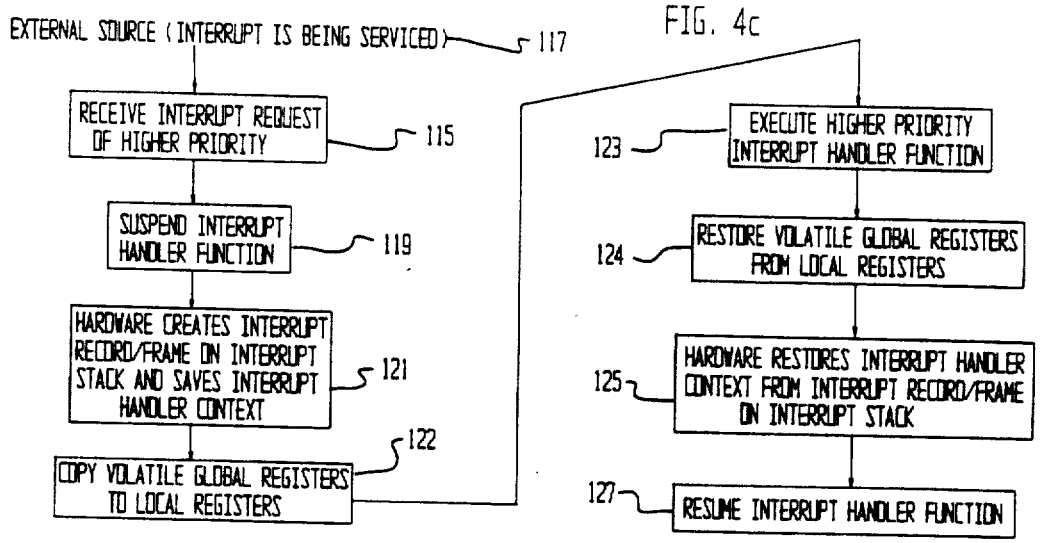

FIGS. 4a, 4b, and 4c, are logic flow charts for the method of the invention illustrating the steps performed by the microprocessor 11 under control of the operating system kernel 69 implementation of the invention which minimize context switching overhead and eliminate the transfer of task context data. The invention manipulates the microprocessor architecture under operating system kernel 69 instructions, i.e., software.

The operating system kernel 69 initializes the processor state field 45 of the process-controls register 35 to "executing", step 71, and then determines which task is to be executed next. A user task is selected, step 73, and a switch is made to the task procedure stack 29, 31, step 74. The method then sets the processor state field 45 to "interrupted" (inverse value of the microprocessor 11 architecture previously defined execute state), step 75. The user task is then executed, step 77. Upon completion of the user task, the method restores the processor state to "executing", step 71, and repeats the cycle of selecting and executing user tasks.

When a task is being executed and an interrupt request signal 79 is received from an external source 81, FIG. 4b, an interrogation is conducted to determine if the interrupt request priority is of higher priority than the current processor interrupt level, step 83. If this interrupt request priority is of lower or equal priority, the interrupt is posted and interrupt servicing is deferred, step 85.

On the other hand, if the interrupt request is of higher priority, the user task step 77 being executed is suspended, step 87, and an interrupt record and frame containing context data of the interrupted task is automatically created by the microprocessor 11 on the current stack, which under the present method is the task procedure stack 29, 31, step 89. Due to the inverse value of the processor state field 45, the microprocessor 11 is 'tricked' into assuming the current stack is the interrupt stack 27. Therefore, the normal stack switch to the interrupt stack is not performed. Volatile global registers are saved in the local registers, step 90.

Thereafter the present method sets the processor state field 45 to "executing", i.e., the inverse value of the microprocessor 11 architecture previously defined interrupt state, step 91. The interrupt request is then serviced by calling the appropriate interrupt handler, step 93.

After the interrupt has been serviced, the operating system kernel 69 determines if a task of higher priority than that of the interrupted task is ready to run, step 95. If there is no higher priority task ready to run, global registers are restored, step 96, and the interrupted task's context data is automatically restored from the task procedure stack during the interrupt return, step 97. This includes that the system state will be restored to the inverse value of the previous convention for the microprocessor 11 architecture defined execute state. The method then resumes execution of the interrupted task of step 77, step 99.

If a higher priority task is ready to run, the operating system kernel 69 selects the higher priority task, step 101, and switches from the interrupted task procedure stack to the higher priority task procedure stack, step 103. It is during the above steps that the method eliminates the copy of the task context data to a temporary area of memory. If the processor state field 45 were not inversely set, the task context data would be on the interrupt stack (rather than the task procedure stack) where it stands the risk of being overwritten if an interrupt should occur while the higher priority task is executing. Therefore, prior to entering the higher priority task, this data would have to have been copied to a temporary holding area.

The method then sets the processor state field to "interrupted", the inverse value for this state, step 107. The higher priority task is executed, step 109. After the higher priority task has completed, the method switches to the interrupted task procedure stack, step 111. The method then restores volatile global registers from the local registers, step 96, executes a return from interrupt which causes the interrupted task context to be restored, step 97, and resumes the interrupted task, step 99. If the interrupt record and frame had not been created on the task procedure stack, the volatile global registers would have to have been saved in the task control block, rather than in the local register set, since the interrupt frame on the interrupt stack and its associated local registers would not have been preserved.

While an interrupt is being serviced and a higher priority interrupt request signal 115 is received from an external source 117, FIG. 4c, the current interrupt handler execution, step 93, is suspended, step 119. Since the current interrupt was serviced with the processor state field 45 inversely set to executing, a stack switch is automatically made by the microprocessor 11 to the interrupt stack 27, where the new interrupt record and frame will be automatically created by the microprocessor 11, step 121. The microprocessor 11 automatically sets the processor state field to "interrupted". Volatile global registers are then saved in the local registers, step 122. The interrupt handler for the higher priority interrupt is executed, step 123. Following the higher priority interrupt servicing, volatile global registers are restored, step 124, the interrupted interrupt handler's context data is automatically restored from the interrupt stack 27, step 125, and the interrupted interrupt handler function step 93 is resumed, step 127.

Steps 87 through 111 represent processing of an interrupt received during task execution, whereby the processor state field is handled by the invention in an "inside-out" convention. Steps 119 through 127 represent processing of an interrupt received during interrupt servicing (i.e. a nested interrupt), whereby the processor state field is handled by the invention in the same manner as the microprocessor defined architecture.

Figure 5A:
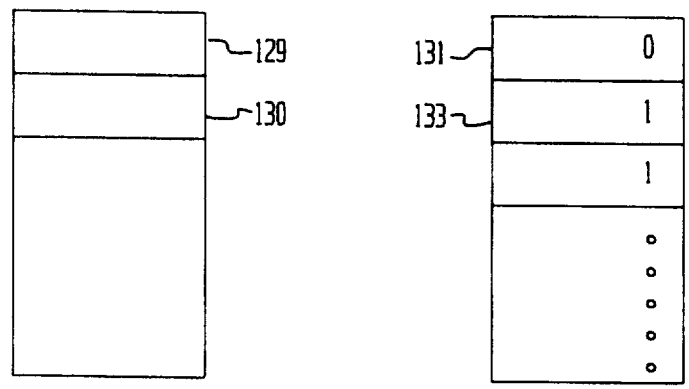
FIG. 5a is a block representation of the task procedure stack of task procedure frames and the interrupt stack of interrupt frames showing processor state bits set for each interrupt frame under the standard method of operation (prior art)

FIG. 5a depicts task procedure frames on a task procedure stack 29, 31 and interrupt frames on the interrupt stack 27 under the previous convention implementation of the processor state field of FIG. 3a. Associated with each interrupt record/frame is the value of the processor state field which is to be restored upon return from the interrupt. Under previous convention usage of the processor state field, FIG. 5a, all task procedure frames are created on the task procedure stack 29, 31 and all interrupt record/frames are created on the interrupt stack 27. Task procedure frames 129, 130 and all succeeding task procedure frames are created on the task procedure stack 29, 31. Interrupt record/frame 131 of interrupt stack 27 contains a processor state value of "0", which indicates that the processor state was equal to executing when the interrupt occurred, i.e., a user task was executing. The fact that an interrupt occurred while the processor state was executing caused the microprocessor to perform a switch from a task procedure stack 29, 31 to the interrupt stack 27. Interrupt record/frame 133 of stack 27 and all succeeding interrupt record/frames contain a processor state value of "1". This indicates that the interrupt occurred while the processor state was equal to interrupted, i.e., servicing another interrupt. The fact that the processor state was interrupted allowed the microprocessor 11 to continue to use the current stack.

Figure 5B:
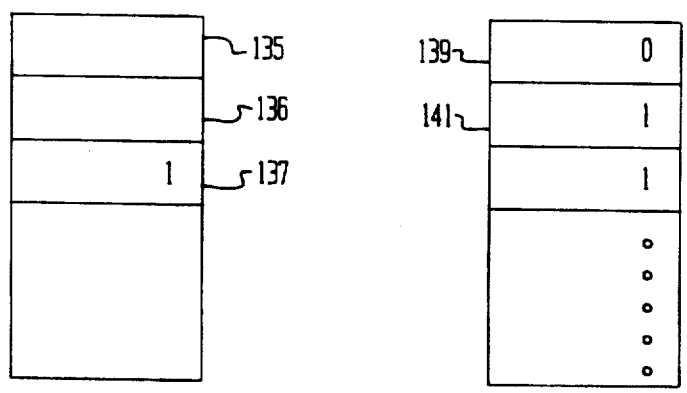
FIG. 5b is a block representation of the task procedure stack of task procedure and interrupt frames and the interrupt stack of interrupt frames showing processor state bits set for each interrupt frame under the inverse method of operation of the present invention.

FIG. 5b depicts task procedure frames and interrupt record/frames for the method of the present invention for a task procedure stack 29, 31 and the interrupt stack 27 under the inverse implementation of the processor state field. Under inverse processor state usage, an interrupt record/frame 137 is created on the current task procedure stack 29, 31 following task procedure frames 135, 136, and is defined by the method of the present invention to contain a processor state value of "1". This indicates that an interrupt occurred while the processor state was set to interrupted, thereby forcing the microprocessor to use the current stack at the current stack location. This enables the interrupt record/frame 137 containing task context data to be conveniently created on the current task procedure stack 29, 31. The next interrupt record/frame 139 is created on the interrupt stack 27, and contains a processor state field value of "0". This indicates that an interrupt occurred while the processor state was set to executing, thereby forcing the microprocessor to switch to the interrupt stack 27 for the first nested interrupt. This enables interrupt record/frames 141 containing interrupt data to be created on the interrupt stack 7. The first interrupt record/frame 141 and all succeeding interrupt record/frames are stored on the interrupt stack 27 with a processor state value of "1", indicating that the interrupt occurred while the processor state was equal to interrupted, i.e., servicing another interrupt. The fact that an interrupt occurred while the processor state was interrupted allowed the microprocessor to continue to use the then currently addressed stack, i.e., the interrupt stack 27, for nested interrupts. Alternate selections for architectural components can be made without departing from the intent or scope of the present invention. Likewise, modifications can be made to the steps of the process without departing from the intent and scope of the invention. Therefore, it is intended that the above description be read as illustrative of the invention and not be taken in the limiting sense.

What is claimed is:

1. A method of "inside-out", inverse operation of operating a multi-tasking, interrupt capable microprocessor system having a user memory stack, an interrupt stack, an interrupt handler mechanism, a register set, and a process-controls register with a state bit defining the operational state of said microprocessor and designating an execute state and an interrupt state, and is comprised of the following steps:

entering a user task;
    setting said state bit to the inverse value of the microprocessor architecture defined execute state;
    executing said user task including establishing a user task procedure stack;
    receiving an interrupt request of higher priority than the current processor interrupt level;
    suspending said user task execution;
    having interrupt record and frame containing user task context automatically stored in said task procedure stack, thereby preventing the microprocessor architecture defined switch to said interrupt stack;
    storing volatile global registers in local registers, which are dedicated to the current interrupt frame;

setting said state bit to the inverse value of the microprocessor architecture defined interrupt state;
servicing said interrupt by operating out of said interrupt frame on said user procedure stack;
restoring volative global registers from local registers;
having said user task context, which includes the inverse value of said state bit, automatically restored from said task procedure stack; and
resuming execution of said interrupted user task.

2. The method of said "inside-out", inverse operation of claim 1 also including the following steps after said suspending said user task execution step:
determining if a preemption is necessary;
executing a user task of higher priority than the said user task which was interrupted when said preemption is determined, said higher priority task being executed from a task procedure stack;
maintaining said interrupted user task context on the said interrupted user task procedure stack; and
switching from said task procedure stack holding said higher priority user task to said interrupted task procedure stack.

3. A method of inverse operation of a multi-tasking priority interrupt capable microprocessor having a processor unit and memory space addressable therefrom, a processor control register and a register set in said processor unit, a processor control block, interrupt table, interrupt stack and at least one task procedure stack in said memory space, an interrupt controller connected to said processor unit, an operating system kernel connected to said processor unit, and an interrupt handler connected to said processor unit, said interrupt controller receiving interrupt signals from external sources, comprising the steps of:
receiving an interrupt request;
interrogating the priority level of said received interrupt request with respect to the current priority level;
suspending the current task in the presence of a higher priority interrupt request;
creating an interrupt record on said procedure stack and saving task context;
copying global registers to local registers;
setting the processor state to executing;
executing the interrupt handler function;
interrogating to determine for a higher priority task;
selecting a higher priority task in the presence of a higher priority task determination;
switching to a higher priority task procedure stack;
setting the processor state to interrupted;
executing the higher priority task;
switching to the interrupted task procedure stack;
restoring said global registers from local registers;
restoring task context from said interrupt record; and
resuming the suspended task.

4. The method of claim 3 wherein after the step of interrogating the priority level of said received interrupt request is the step of:
posting said interrupt request when it is of a lower priority and deferring the servicing of said interrupt request.

5. The method of claim 3 wherein after the step of interrogating to determine for a higher priority task, said step of restoring global registers is entered in the absence of higher priority task preemption determination.

6. A method of inverse operation of a mutli-tasking priority interrupt capable microprocessor having a processor unit and memory space addressable therefrom, a processor control register and a register set in said processor unit, a processor control block, interrupt table, interrupt stack and at least one task procedure stack in said memory space, an interrupt controller connected to said processor unit, an operating system kernel connected to said processor unit, and an interrupt handler connected to said processor unit, said interrupt controller receiving interrupt signals from external sources, comprising the steps of:
receiving an interrupt request of higher priority while an interrupt is being serviced;
suspending said interrupt handler function;
creating an interrupt record on said interrupt stack;
copying global registers to local registers;
executing higher priority interrupt handler function;
restoring said global registers from local registers;
restoring interrupt handler context from said interrupt record on said interrupt stack; and
resuming said interrupt handler function.

* * * * *